United States Patent Office 3,247,253
Patented Apr. 19, 1966

3,247,253
TETRAHYDRO NAPHTHALEN-1-ONES
William Laszlo Bencze, New Providence, N.J., assignor to Ciba Corporation, a corporation of Delaware
No Drawing. Original application Mar. 21, 1961, Ser. No. 97,171, now Patent No. 3,135,799, dated June 2, 1964. Divided and this application July 22, 1963, Ser. No. 296,443
4 Claims. (Cl. 260—590)

This application is a division of my application Serial No. 97,171, filed March 21, 1961, and now U.S. Patent No. 3,135,799.

The present invention concerns benz[b]cycloalkan-1-ones, which contain in the α-position to the carbonyl group an amino-phenyl group. More especially the present invention relates to compounds of the formula:

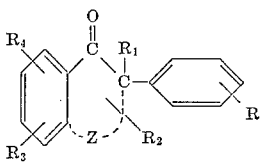

in which R represents an amino group, Z stands for an alkylene radical containing from one to three carbon atoms, each of the groups $R_1$ and $R_2$ stands for hydrogen or lower alkyl, and each of the groups $R_3$ and $R_4$ stands for hydrogen, an aliphatic radical, particularly lower alkyl, a substituted aliphatic radical, particularly halogeno-alkyl, hydroxyl, etherified hydroxyl, particularly lower alkoxy, esterified hydroxyl, particularly halogeno, mercapto, etherified mercapto, particularly halogeno, mercapto, etherified mercapto, particularly lower alkyl-mercapto, nitro or amino, ketone derivatives of such compounds, or salts thereof, as well as process for the preparation of such compounds.

The amino group R may be located in the 2-position (o-position) or in the 3-position (m-position) of the phenyl ring, but substitutes primarily the 4-position (p-position). R represents especially a primary (unsubstituted) amino group; it may also stand for a secondary (monosubstituted) amino group, such as N-lower alkyl-amino, e.g., N-methyl-amino, N-ethyl-amino, and the like, tertiary (disubstituted) amino group, such as N,N-di-lower alkyl-amino, e.g., N,N-dimethylamino, N-ethyl-N-methyl-amino, N,N-diethylamino and the like, or more especially an N-acyl-amino group, in which acyl represents the acyl radical of an organic carboxylic acid, for example, N-lower alkanoyl-amino, e.g., N-acetyl-amino, N-propionyl-amino, N-pivaloyl-amino and the like, N-substituted lower alkanoyl-amino, e.g., N-cyclohexylacetyl-amino, N-3-cyclopentylpropionyl-amino, N-dichloroacetyl-amino and the like, N-carbocyclic aroyl-amino, particularly N-monocyclic carbocyclic aroyl-amino, such as N-benzoyl-amino, or N-(lower alkoxy-benzoyl)-amino, e.g., N-(4-methoxy-benzoyl)-amino, N-(3,4,5-trimethoxy-benzoyl)-amino and the like, N-(halogeno-benzoyl)-amino, e.g., N-(3,4-dichloro-benzoyl)-amino, N-(4-fluoro-benzoyl)-amino, N-(2,5-dibromo-benzoyl)-amino and the like, N-(amino-benzoyl)-amino, e.g., N-(3-N,N-dimethyl-amino-benzoyl)-amino and the like, N-carbocyclic aryl-lower alkanoyl-amino, such as N-monocyclic-carbocyclic aryl-lower alkanoyl-amino, particularly N-phenyl-lower alkanoyl-amino, e.g., N-phenyl-acetyl-amino and the like, N-carbocyclic aryl-lower alkenoyl-amino, such as N-monocyclic carbocyclic aryl-lower alkenoyl-amino, especially N-phenyl-lower alkenoyl-amino, e.g., N-cinnamoyl-amino and the like, or N-heterocyclic aroyl-amino, such as N-monocyclic heterocyclic aroyl-amino, especially N-pyridoyl-amino, e.g., N-nicotinoyl-amino, N-isonicotinoyl-amino and the like, or N-furoyl-amino and the like, or any other N-acyl-amino group. The R-substituted phenyl group in the above formula represents, therefore, amino-phenyl, especially 4-N-amino-phenyl, as well as N-lower alkyl-amino-phenyl, especially 4-N-lower alkyl-amino-phenyl, e.g., 4-N-methyl-amino-phenyl, 4-N-ethyl-amino-phenyl and the like, N,N-di-lower alkyl-amino-phenyl, especially 4-N,N-di-lower alkyl-amino-phenyl, e.g., 4-N,N-dimethylamino-phenyl, 4-N-ethyl-N-methyl-amino-phenyl, 4-N,N-diethylamino-phenyl and the like, N-acyl-amino-phenyl, especially 4-N-acylamino-phenyl, such as N-lower alkanoyl-amino-phenyl, especially 4-N-lower alkanoyl-amino-phenyl, e.g., 4-N-acetylamino-phenyl, 4-N-propionyl-amino-phenyl, 4-N-pivaloylamino-phenyl and the like, N-substituted lower alkanoyl-amino-phenyl, especially 4-N-substituted lower alkanoyl-amino-phenyl, e.g., 4-N-cyclohexyl-acetyl-amino-phenyl, 4-N-(3-cyclopentyl-propionyl) - amino - phenyl, 4 - N-dichloroacetyl-amino-phenyl and the like, N-benzoyl-amino-phenyl, especially 4-N-benzoyl-amino-phenyl and the like, N-lower alkoxy-benzoyl)-amino-phenyl, especially 4-N-(lower alkoxy-benzoyl)-amino-phenyl, e.g., 4-N-(4-methoxy-benzoyl)-amino - phenyl, 4 - N-(3,4,5-trimethoxybenzoyl)-amino-phenyl and the like, N-(halogeno-benzoyl)-amino-phenyl, especially 4-N-(halogeno-benzoyl)-amino-phenyl, e.g., 4-N-(3,4-dichloro-benzoyl)-amino-phenyl, 4 - N-(4-fluoro-benzoyl) - amino - phenyl, 4 - N-(2,5-dibromo-benzoyl)-amino-phenyl and the like, N-(amino-benzoyl-amino-phenyl, especially 4-N-(amino-benzoyl)-amino-phenyl, e.g., 4 - N - (N,N-dimethylamino-benzoyl)-amino-phenyl and the like, N-phenyl-lower alkenoyl-amino-phenyl, especially 4-N-phenyl-lower alkenoyl-amino-phenyl, e.g., 4-N-phenylacetyl-amino-phenyl and the like, N-phenyl-lower alkenoyl-amino-phenyl, especially 4-N-phenyl-lower alkenoyl-amino-phenyl, e.g. 4-N-cinnamoyl-amino-phenyl and the like, N-pyridoyl-amino-phenyl, especially 4-N-pyridoyl-amino-phenyl, e.g. 4-N-nicotinoyl-amino-phenol, 4-N-isonicotinoyl-amino-phenyl and the like, as well as the corresponding amino-phenyl groups, in which the above-described primary, secondary, tertiary or acylated amino groups are located in the 2-position (o-position) or the 3-position (m-position).

The alkylene radical Z contains primarily two carbon atoms and represents 1,2-ethylene, thus forming together with the 2-phenylethyl portion a 1,2,3,4-tetrahydronaphthalene ring. When standing for an alkylene radical containing one carbon atom (i.e., methylene) or three carbon atoms (i.e., 1,3-propylene), Z together with the 2-phenylethyl portion forms an indane and a benzsuberane ring system, respectively.

Each of the groups $R_1$ and $R_2$, attached to the carbon atom carrying the pyridyl group and to one of the carbon atoms of the alkylene radical Z, respectively, represents hydrogen or lower alkyl, e.g., methyl, ethyl, n-propyl, iso-propyl and the like.

The groups $R_3$ and $R_4$ attached to any of the position available for substitution in the carbocyclic aryl portion of the molecule, stand for hydrogen, as well as for aliphatic radicals, particularly lower alkyl, e.g., methyl, ethyl, isopropyl and the like, substituted aliphatic radicals, such as halogeno-lower alkyl, particularly trifluoro-methyl and the like, hydroxyl, etherified hydroxyl, such as lower alkoxy, e.g., methoxy, ethoxy, n-propyloxy, isopropyloxy, n-butyloxy and the like, esterified hydroxyl, particularly halogeno (representing hydroxyl esterified with a hydrohalic acid), e.g., fluoro, chloro, bromo and the like, mercapto, etherified mercapto, particularly lower-alkyl-mercapto, e.g. methylmercapto, ethyl-mercapto and the like, nitro, amino, especially primary amino, as well as secondary amino, such as N-lower alkyl-amino, e.g. N-methylamino, alkyl-amino, e.g. N,N-dimethylamino, N-ethyl-N-methyl-amino, N,N-diethylamino and the like, as well as N-acyl-amino, in which acyl represents the acyl radical of an organic carboxylic acid, such as one of the above-mentioned N-acyl-amino groups.

Ketone derivatives of the compounds of this invention are primarily derivatives with nitrogen-containing ketone reagents, particularly with hydroxylamine, as well as with hydrazines, semicarbazides, thiosemicarbazides and the like. Ketone derivatives are, therefore, primarily oximes, as well as the hydrazones, semicarbazones, thiosemicarbazones and the like. Other ketone derivatives are ketals with lower alkylenediols, e.g. ethylene glycol, 1,2-propylene glycol and the like, hydroxy-lower alkylmercaptans, e.g., 2-hydroxy-ethylmercaptan and the like, lower alkylene-dithiols, e.g., 1,2-dimercapto-ethane and the like.

Salts of the compounds of this invention are particularly therapeutically acceptable acid addition salts, primarily those with inorganic acids, e.g., hydrochloric, hydrobromic, nitric, sulfuric, phosphoric acids, as well as with organic carboxylic or organic sulfonic acids, e.g. acetic, propionic, glycolic, maleic, hydroxymaleic, dihydroxymaleic, malic, tartaric, citric, salicylic, 4-aminosalicylic, 2-acetoxy-benzoic, methane sulfonic, ethane sulfonic, 2-hydroxyethane sulfonic, benzene sulfonic, toluene sulfonic acid and the like. Salts which are primarily used for identification purposes are particularly those with acidic organic nitro compounds, e.g. picric, picrolonic, flavianic acid and the like, or with heavy metal complex acids, e.g. phosphotungstic, phosphomolybdic, chloroplatinic, Reinecke acid and the like. Mono- or poly-salts may be formed depending on the number of salt forming groups present in a compound and/or the procedure used for the salt formation.

The compounds of this invention inhibit certain functions of the adrenal cortex. Known adrenal corticoid inhibitors, which cause a decrease in the secretion of corticoid steroids, as, for example, 1,2-bis-(3-pyridyl)-2-methyl-1-propanone, exhibit a decrease in the secretion of hydrocortisone (Compound F) and corticosterone (Compound B), which decreases are accompanied by a marked increase in the secretion of 11-desoxy-17α-hydroxy-corticosterone (Compound S); others show a decrease of the secretion of hydrocortisone (Compound F), 11-desoxy-17α-hydroxy-corticosterone (Compound S) and aldosterone, but cause an increase in the secretion of corticosterone (Compound B). Still other adrenal cortex inhibitors, such as, for example, 3,3-di-(4-aminophenyl)-2-butanone, although they show a decrease in the secretion of hydrocortisone (Compound F), corticosterone (Compound B) and 11-desoxy-17α-hydroxycorticosterone (Compound S), they have no effect on the secretion of aldosterone and are usually accompanied by numerous side-effects, such as progestational properties, anesthetic and hypothermic activities, an inhibition of the functioning of the thyroid gland, liver hypertrophy and the like.

We have now found that the compounds of this invention exhibit a marked decrease in the secretion of hydrocortisone (Compound F), corticosterone (Compound B), and 11-desoxy-17α-hydroxy-corticosterone (Compound S); on the basis of these results, it appears that the compounds of this invention are inhibitors of the 11α-hydroxylase and the 17α-hydroxylase enzyme systems. Furthermore, they are remarkably free from any other pharmacological activities or the above-mentioned undesired side-effects characteristic of certain adrenal cortex inhibitors.

The compounds of the present invention, having specific adrenal cortex inhibiting effects, can, therefore, be used as diagnostic tools for the determination of the functioning of the pituitary gland, as well as agents in the treatment of adrenal cortical hyperfunction, as present in Cushing's syndrome, primary aldosteronism, secondary aldosteronism and the like. Furthermore, the preferential inhibition of certain hydroxylases, such as the 11-β-hydroxylase or the 17α-hydroxylase, makes the compounds of this invention useful as aids in the study of the biosynthetic pathways of corticoid hormone formation. It has also been determined by way of tests in dogs, that the compounds of this invention show excellent oral activity.

The compounds of the formula:

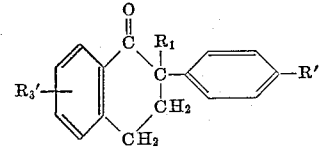

in which R' represents amino or N-acyl-amino, particularly N-alkanoyl-amino, e.g., N-acetyl-amino, N-propionyl-amino and the like, or N-pyridoyl-amino, e.g., N-nicotinoyl-amino, N-isonicotinoyl-amino and the like, $R_1$ has the previously given meaning, but represents primarily hydrogen, as well as lower alkyl, e.g., methyl and the like, and $R_3'$ represents especially hydrogen, as well as lower alkyl, e.g., methyl, ethyl, isopropyl, and the like, lower alkoxy, e.g., methoxy, ethoxy, isobutyloxy and the like, halogeno, e.g., fluoro, chloro, bromo and the like, nitro or amino, the oximes thereof and the therapeutically acceptable acid addition salts of such compounds, represent a preferred group of compounds which show particularly outstanding adrenal inhibiting effects of the above-mentioned type.

The new compounds of this invention may be used in the form of pharmaceutical preparations, which contain the new compounds or salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other carrier known to be used in medicaments. The pharmaceutical preparations may be in the solid form, for example, as capsules, tablets, dragees and the like, or in liquid form, for example, as capsules, tablets, dragees and the like, or in liquid form, for example, as solutions, suspensions, emulsions and the like. If desired, they may contain auxiliary substances such as preserving, stabilizing, wetting, emulsifying agents and the like, salts for varying the osmotic pressure, buffers, etc. They may also contain, in combination, other pharmacologically useful substances.

The compounds of the present invention may be prepared, for example, by converting in a benz[b]cycloalkan-1-one, which contains in the position adjacent to the carbonyl group a phenyl radical carrying a substituent capable of being converted into an amino group, especially in a compound of the formula:

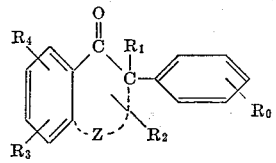

in which Z, $R_1$, $R_2$, $R_3$ and $R_4$ have the previously given meaning, and $R_0$ stands for a substituent capable of being converted into an amino group, or a ketone derivative thereof, the substituent attached to the phenyl radical, especially the group $R_0$, into an amino group, and, if desired, converting in a resulting compound containing a primary amino group, such primary amino group into a secondary, a tertiary or an N-acylated amino group, and/or, if desired, replacing in a resulting compound, which contains a hydrogen atom attached to the carbon atom adjacent to the carbonyl group, such hydrogen atom by lower alkyl, and/or, if desired, converting in a resulting benz[b]cycloalkan-1-one compound a substituent attached to the benz-portion into another substituent, and/or, if desired, introducing a substituent into the benz-portion of a resulting benz[b]cycloalkan-1-one, and/or, if desired, converting a resulting salt into a free compound, and/or, if desired, converting a resulting compound into a ketone derivative thereof, and/or, if desired, converting a resulting compound or a ketone derivative into a salt, and/or, if desired, separating a resulting mixture of isomers into the single isomers.

A group $R_0$ capable of being converted into an amino group is particularly a halogeno atom having an atomic weight greater than 19, especially bromo, as well as chloro or iodo. Such halogeno group may be exchanged for amino by treatment with ammonia. Ammonolysis may be carried out according to known methods, for example, by treatment with liquid ammonia, or more especially with a concentrated solution of ammonia in a suitable solvent, such as water and the like. The reaction is preferably carried out in the presence of a catalyst, primarily a copper catalyst, such as copper powder, a cuprous halide, e.g., cuprous iodide and the like, or a mixture of such catalysts, e.g., a mixture of copper powder and cuprous iodide. The reaction is performed in a closed vessel and at an elevated temperature, for example, at between 100° and 250°, preferably while shaking the reaction mixture.

Another group $R_0$ capable of being converted into the amino group is represented by the nitro group; its conversion into an amino group is carried out by reduction according to known methods. Such methods are, for example, treatment with hydrogen in the presence of a catalyst containing a metal of the eighth group of the Periodic System, e.g. nickel, palladium, platinum and the like, or treatment with nascent hydrogen, such as generated by a metal in the presence of a hydrogen donor, e.g. zinc and acetic acid, iron and hydrochloric acid, sodium and a lower alkanol, e.g. ethanol and the like, or other sources of nascent hydrogen, or with a light metal hydride, e.g. sodium borohydride and the like; these reagents are used under known conditions. Whenever necessary, the oxo group in the starting material is temporarily protected, for example, by ketalization with a glycol, e.g. ethylene glycol and the like, which is carried out in the presence of a catalytic amount of an acid, e.g., p-toluene sulfonic acid and the like; a ketalized oxo group, e.g., an ethylenedioxy group and the like, may be split after the reduction to liberate the desired oxo group according to known methods, for example, by treatment with an acid, e.g., acetic, perchloric acid and the like.

The starting materials used in the above reaction are new and are intended to be included within the scope of this invention. Especially useful as intermediates are the compounds of the formula:

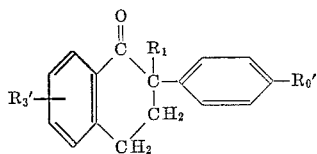

in which $R_1$ and $R_3'$ have the previously given meaning, and in which $R_0'$ stands for bromo or nitro.

They may be prepared according to different procedures. For example, those in which $R_0$ represents halogeno, especially bromo, may be formed, for example, by reacting the salt of a functional derivative of a phenyl-acetic acid, in which phenyl is substituted by halogeno, especially bromo, with a reactive ester of a phenyl-lower alkanol, particularly by reacting an alkali metal salt of a compound of the formula:

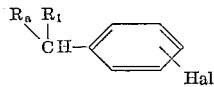

in which $R_1$ has the previously given meaning, $R_a$ represents a functionally converted carboxyl group, and Hal stands for halogeno, particularly bromo, with a compound of the formula:

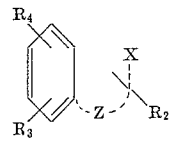

in which Z, $R_2$, $R_3$ and $R_4$ have the previously given meaning, and X represents a reactive esterified hydroxyl group, particularly a halogeno atom, and, if necessary, converting in a resulting compound a functionally converted carboxyl group into the free carboxyl group or into another functionally converted carboxyl group, and treating the resulting phenyl-alkane carboxylic acid, which contains in the position adjacent to the carboxyl group a phenyl group carrying a halogeno atom capable of being converted into an amino group, or a reactive functionally converted derivative thereof, particularly a compound of the formula:

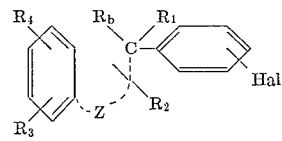

in which $R_1$, $R_2$, $R_3$, $R_4$, Z and Hal have the previously given meaning, and $R_b$ represents a free or functionally converted carboxyl group, with a strong Lewis acid, and, if desired, replacing in a resulting compound which contains a hydrogen atom attached to the carbon atom adjacent to the carbonyl group, such hydrogen atom by lower alkyl, and/or, if desired, converting in a resulting compound a substituent attached to the carbocyclic aryl portion into another substituent, and/or, if desired, introducing into the carbocyclic aryl portion of a resulting compound a substituent.

A salt of a functional derivative of a phenyl-acetic acid is primarily a salt with an alkali metal, e.g., lithium, sodium, potassium and the like; it may be prepared according to known methods, for example, by treatment with an alkali metal, an alkali metal hydroxide, an alkali metal amide, an alkali metal lower alkanolate and the like, using appropriate inert solvents as diluents. A functionally converted carboxyl group as represented by $R_a$ is primarily a cyano group; the starting material is, therefore, primarily a salt of a phenyl-acetonitrile having the formula:

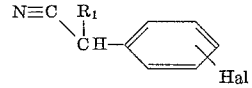

in which $R_1$ and Hal have the previously given meaning.

The reactively esterified hydroxyl group in the second reagent is primarily a hydroxyl group esterified with a strong inorganic acid, particularly mineral acid, e.g., hydrochloric, hydrobromic, hydroiodic, sulfuric acid and the like, or a strong organic sulfonic acid, e.g., p-toluene sulfonic acid. Such group, for example, the group X in the above formula, is therefore represented above all by a halogeno atom, e.g., chloro, bromo, iodo and the like, as well as any other analogous, reactively esterified hydroxyl group. These compounds may be prepared, for example, by treating the corresponding phenyl-lower alkanol with an appropriate reagent capable of converting a free hydroxyl group into a reactively esterified hydroxyl group, for example, with a thionyl halide, e.g., thionyl chloride and the like.

The reaction of the salt of a functionally converted phenyl-acetic acid and the reactive ester of a phenyl-lower alkanol is carried out according to known methods, preferably in the presence of an inert solvent, for example, toluene, N,N-dimethylformamide and the like,. and, if necessary, while cooling or heating, and/or in the atmosphere of an inert solvent.

A functionally converted carboxyl group $R_a$ in the intermediate starting material is converted into a free carboxyl or another functionally converted carboxyl group, represented by $R_b$, according to known methods. For example, a cyano group may be converted into a carbamyl group or a free carboxyl group by treatment with an aqueous solution of an alkali metal hydroxide, e.g., sodium hydroxide and the like.

In the resulting intermediate, the group $R_b$ in the above-given formula, is free a carboxyl group, but may also stand for a functionally converted carboxyl group, such as, for example, carbamyl, as well as carbo-lower alkoxy, e.g. carbomethoxy, carbethoxy and the like, halogeno-carbonyl, e.g. chloro-carbonyl and the like.

The ring closure to the starting material may be effected by treating the intermediate compounds with a strong Lewis acid ring closing reagent selected from the group of Friedel-Crafts reagents, such as, for example, polyphosphoric acid, stannic chloride, aluminum chloride, sulfuric acid, hydrochloric acid, boron trifluoride and the like. If necessary, the mixture of the starting material and the ring closing reagent is diluted with an appropriate inert solvent, whose selection depends largely on the solubility capacity of the starting material and the nature of the ring closing reagent; preferred inert solvents are, for example, benzene, toluene, hexane, carbon disulfide, diethyl ether and the like. The reaction is preferably carried out at an elevated temperature, if necessary, in a closed vessel and/or in the atmosphere of an inert gas, e.g., nitrogen.

On the other hand, starting materials, in which $R_0$ represents a nitro group may be prepared, for example, by nitrating a benz[b]cycloalkan-1-one, which contains in the position adjacent to the carbonyl group a phenyl group, particularly a compound of the formula:

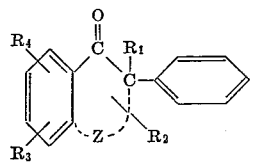

in which $R_1$, $R_2$, $R_3$, $R_4$ and Z have the previously given meaning, with nitric acid, and, if desired, carrying out optional steps.

Nitration may be performed according to known methods, for example, by the treatment with nitric acid, e.g., fuming nitric acid and the like, preferably in the presence of a suitable solvent, e.g., acetic acid anhydride, sulfuric acid and the like.

The intermediates used in the nitration step may be prepared according to the previously described ring closing procedure using one of the above-described Lewis acid ring-closing reagent. The substituent $R_b$ stands primarily for a free carboxyl group and ring closure is effected, for example, by treatment with polyphosphoric acid and the like.

The compounds of the present procedure may also be prepared by treating a phenyl-alkane carboxylic acid, which contains an amino-phenyl group adjacent to the carboxyl group, or a reactive functionally converted derivative thereof, particularly of compound of the formula:

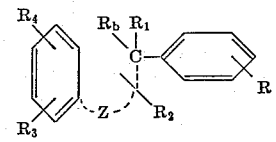

in which $R_1$, $R_2$, $R_3$, $R_4$, $R_b$ and Z have the previously given meaning, or a salt thereof, with a strong Lewis acid ring-closing reagent, and, if desired, carrying out the optional steps.

The ring-closure of the above-described starting materials may be carried out as previously shown. The starting materials used in the above procedure are prepared according to the previously described procedure; if necessary, a primary or secondary amino group desired in the final products may be temporarily protected, for example, by acylation and the like.

In a resulting compound containing a primary amino group R, such group may be converted into secondary, tertiary or acylated amino groups according to known methods, for example, by alkylation and acylation, respectively, using the appropriate reagents, such as, for example, alkyl halides, formaldehyde and formic acid, and reactive functional derivatives of carboxylic acids, respectively.

In a compound resulting from one of the above procedures, in which a hydrogen atom is attached to the carbon atom adjacent to the carbonyl group, such hydrogen atom may be replaced by lower alkyl; in other words, the group $R_1$ in a resulting compound, whenever representing hydrogen, may be replaced by lower alkyl. The replacement may be carried out according to any known alkylation procedure. For example, a salt, particularly an alkali metal salt, may be formed by treating a resulting benz[b]cycloalkan-1-one with a salt-forming, e.g., alkali metal salt-forming, reagent, such as, for example, an alkali metal, e.g., lithium, sodium, potassium, or an alkali metal, e.g., lithium, sodium, potassium and the like, hydride, amide, lower alkanolate, such as methanolate, ethanolate, tertiary butanolate and the like, in the presence of an appropriate inert solvent and reacting the resulting metal, particularly alkali metal, salt with a reactive ester of a lower alkanol, particularly a lower alkyl halide, e.g. methyl, ethyl, n-propyl, isopropyl, n-butyl, isobutyl, secondary butyl chloride, bromide or iodide and the like. The alkylation reaction may be carried out while cooling, at room temperature or at an elevated temperature, and/or, if necessary, in a closed vessel and/or in the atmosphere of an inert gas, e.g. nitrogen.

Certain substituents attached to the benz-portion of a resulting benz[b]cycloalkan-1-one compound may be converted into other substituents. For example, a nitro group may be reduced to an amino group according to known reduction methods, and the latter may be converted into a halogeno atom by diazotization, followed by treatment with a cuprous halide according to the Sandmeyer reaction.

Furthermore, a substituent may be introduced into the benz-portion of a resulting benz[b]cycloalkan-1-one compound. For example, upon nitration with a suitable nitrating reagent a nitro group may be introduced into the aromatic portion.

Ketone derivatives of the resulting compounds are prepared according to known methods. For examples, the nitrogenous ketone derivatives, particularly the oximes, as well as the hydrazones, semicarbazones, thiosemicarbazones and the like, may be prepared by treating the resulting ketone compound with the reagent or a salt thereof, especially with hydroxylamine or a salt, such as the hydrochloride, sulfate and the like, thereof, as well as with a hydrazine, a semicarbazide, a thiosemicarbazide and the like, or a salt thereof. The reaction is preferably carried out while heating in the presence of an inert solvent and of an acid neutralizing reagent, e.g., sodium carbonate and the like, particularly whenever an acid addition salt of a reagent is used, and/or a buffer, e.g., sodium acetate and the like, and/or in the atmosphere of an inert gas, e.g., nitrogen. Other ketone derivatives, such as the ketals, are prepared by reacting the resulting ketone compound with the reagent, such as ethylene glycol and the like, in the presence of a catalytic amount of a suitable acid, e.g. toluene sulfonic acid and the like.

Depending on the conditions used, the compounds of this invention, their ketone derivatives and N-oxides thereof are obtained in the form of the free bases or as the salts thereof. A salt may be converted into the free base, for example, by treatment with a base, such as, for example, an alkali metal hydroxide, e.g. lithium hydroxide, sodium hydroxide, potassium hydroxide and the like, an alkali metal carbonate, e.g. lithium, sodium or potassium carbonates or hydrogen carbonates and the like, or any other suitable base, or with an anion exchange resin and the like. A free base may be converted into its therapeutically useful acid addition salts by reacting the former with an acid, such as one of those mentioned hereinbefore, for example, by treating a solution of the base in a suitable solvent, such as a lower alkanol, e.g., methanol, ethanol, n-propanol, isopropanol and the like, an ether, e.g., diethylether, tetrahydrofuran and the like, a lower alkyl lower alkanoate, e.g., methyl acetate, ethyl acetate and the like, or any other inert solvent or mixture of diluents with the acid or a solution thereof. Salts may also be obtained as the hemihydrates, monohydrates, sesquihydrates or polyhydrates or contain solvent of crystallization depending on the conditions used in the formation of the salts.

The new compounds of this invention may be obtained in the form of mixtures of racemates, which mixtures may be separated into the individual racemates on the basis of physico-chemical differences, such as solubility and the like, for examples, by fractional crystallization, fractional distillation and the like.

Racemates of the compounds of this invention may be resolved into the optically active d- and l-forms according to known procedures used for the resolution of racemic compounds. For example, the free base of a racemic d,l-compound, dissolved in an appropriate solvent, such as a lower alkanol, e.g. methanol, ethanol and the like, a halogenated aliphatic hydrocarbon, e.g. methylene chloride, chloroform and the like, or any other suitable diluent, may be treated with one of the optically active forms of an acid containing an asymmetric carbon atom or a solution thereof, for example, in one of the previously mentioned diluents. Especially useful as optically active forms of salt forming acids having an asymmetric carbon atom are D-tartaric (also l-tartaric) and L-tartaric (also d-tartaric) acid, as well as the optically active forms of malic, mandelic, camphor-10-sulfonic, quinic, di-o-toluyl-tartaric acid and the like. A salt may then be isolated, which is formed by the optically active acid with the optically active form of the base. From a resulting salt, the free and optically active base may be obtained according to known methods, such as outlined hereinbefore, and an opically active base may be converted into a therapeutically useful acid addition salt with an acid such as one of those mentioned hereinbefore. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 13.2 g. of 2-(4-bromo-phenyl)-1,2,3,4-naphthalen-1-one, 1.65 g. of copper powder and 1.65 g. of cuprous iodide in 230 ml. of concentrated ammonium hydroxide (of 28 percent strength) is placed into a glass-lined, stainless steel autoclave. The reaction mixture is heated in the sealed container to 180° for twelve hours while shaking, and is then allowed to cool to room temperature. The aqueous phase is decanted from the oily reaction product, which is free from ammonia by applying a partial vacuum, and then diluted with water. The pH is adjusted to approximately 7 by adding crystalline glycine and acetic acid. The aqueous and the organic phase are filtered to remove any copper powder and copper salt residues, and the aqueous phase is further extracted with two portions of ethyl acetate. The combined organic extracts are washed with water and saturated aqueous sodium chloride solution and dried over sodium sulfate; after filtration, the solvent is evaporated under reduced pressure.

The resulting dark gum is dissolved in benzene and the solution is treated with charcoal and filtered. The filtrate is shaken with 200 ml. of 2 N aqueous hydrochloric acid, whereupon a precipitate is formed which is suspended in both layers. The solid material is filtered off, washed with benzene and 2 N aqueous hydrochloric acid. The solid material is recrystallized several times from a mixture of ethanol and diethyl ether to yield the desired 2-(4-amino-phenyl)-1,2,3,4 - tetrahydro-naphthalen-1-one hydrochloride, M.P. 232–234°; yield: 5.2 g.

To a solution of 1.2 g. of 2-(4-amino-phenyl)-1,2,3,4-tetrahydro-naphthalen-1-one hydrochloride in 24 ml. of water is added a 2 N aqueous solution of sodium carbonate whereupon an oil is formed, which is taken up into ethyl acetate. The organic solution is washed with water and saturated aqueous sodium chloride solution, then dried over sodium sulfate and evaporated to yield a viscous oil, which crystallizes slowly. The resulting 2-(4-amino-phenyl)-1,2,3,4-tetrahydro-naphthalen-1-one of the formula:

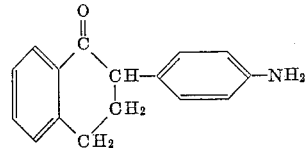

is recrystallized from a mixture of benzene and diethyl ether to yield 0.87 g. of the free base, which melts at 98–99° and boils at 150–160°/0.3 mm.

The starting material may be prepared as follows: To a solution of 33.8 g. of 4-bromo-phenyl-acetonitrile in 140 ml. of N,N-dimethylformamide is added 8.25 g. of a mineral oil suspension of sodium hydride (of 53 percent strength) while cooling in an ice bath. The mixture is stirred for one hour; a solution of 31.8 g. of 2-phenyl-ethyl bromide in 140 ml. of toluene is then added and stirring is continued at room temperature for an additional three hours. The inorganic precipitate is filtered off, the filtrate is concentrated under reduced pressure, and the resulting residue is taken up in water. The organic material is extracted with three portions of diethyl ether, the oganic layer is washed with a saturated aqueous solution of sodium chloride and dried over sodium sulfate. The desired 2-(4-bromo-phenyl)-4-phenyl-butyronitrile is recovered by evaporating the solvent and distilling the residue; the distillate is collected between 135° and 178° at 0.1 mm.; yield: 35.8 g.

A mixture of 35 g. of 2-(4-bromo-phenyl)-4-phenyl-butyronitrile and 70 g. of sodium hydroxide in 140 ml. of 95 percent ethanol and 70 ml. of water is refluxed for 64 hours. The organic solvent is removed under reduced pressure, water is added and the solution is acidified with concentrated hydrochloric acid. The organic material is extracted with three portions of diethyl ether; the combined organic extracts are washed with water and a saturated aqueous solution of sodium chloride, dried over sodium sulfate and evaporated to dryness. The residue crystallizes slowly in a pentane suspension to yield 21.7 g. of 2-(4-bromo-phenyl)-4-phenyl-butyric acid, M.P. 73–74°.

To a solution of 21.7 g. of 2-(4-bromo-phenyl)-4-phenyl-butyric acid in 75 ml. of diethyl ether containing three drops of pyridine is added dropwise 8.5 g. of thionyl chloride. The reaction mixture is refluxed for a few minutes, and the excess thionylchloride is removed under reduced pressure. 5 ml. of benzene is added, and the mixture is again concentrated; diluting with benzene and concentrating the solution is repeated twice to ensure complete removal of the excess of thionyl chloride.

The crude 2-(4-bromo-phenyl)-4-phenyl-butyric acid chloride is taken up in 150 ml. of benzene; the solution is cooled in an ice bath and treated with 18 g. of stannic chloride in 15 ml. of benzene, which is added dropwise. Stirring is maintained for 1½ hours at room temperature; 3 ml. of concentrated hydrochloric acid and 27 ml. of water are then added and stirring at room temperature is continued for an additional hour. The organic layer is separated, washed with water, a 2 N aqueous solution of sodium carbonate, water and a saturated aqueous sodium chloride solution, dried over sodium sulfate and evaporated to dryness. The desired 2-(4-bromo-phenyl)-1,2,3,4-tetrahydro-naphthalen-1-one of the formula:

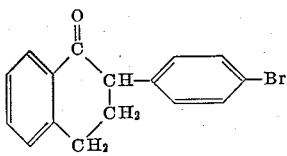

is recrystallized from ethanol using charcoal as a decolorizing agent, M.P. 116–118°; yield: 14.5 g.

*Example 2*

The 2-(4-amino-phenyl)-1,2,3,4-tetrahydro-naphthalen-1-one tartrate (colorless prisms), M.P. 148–150°, and the 2-(4-amino-phenyl)-1,2,3,4-tetrahydro-naphthalen-1-one citrate (pink needles), M.P. 156–158° (decomposition), are prepared by adding an excess of tartaric acid or citric acid to a suspension of 2-(4-amino-phenyl)-1,2,3,4-tetrahydro-naphthalen-1-one in water warming the mixture and allowing it to cool, whereupon crystallization occurs.

*Example 3*

To a solution of 8.5 g. of 2-methyl-2-(4-nitro-phenyl)-1,2,3,4-tetrahydro-naphthalen-1-one in 75 ml. of ethanol is added 38 ml. of concentrated hydrochloric acid and the mixture is then treated with 230 g. of stannous chloride hydrate in 15 ml. of concentrated hydrochloric acid and refluxed for two hours. The acidic solution is then neutralized with 102 ml. of 50 percent aqueous sodium hydroxide while cooling in an ice bath, and the resulting slurry is stirred with 300 ml. of ethyl acetate. The organic layer is decanted, washed with water and a saturated aqueous solution of sodium chloride and dried over sodium sulfate. The organic solvent is then evaporated to dryness and the crude 2-(4-amino-phenyl)-2-methyl-1,2,3,4-tetrahydro-naphthalen-1-one of the formula:

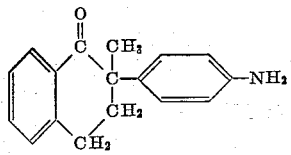

is recrystallized from a mixture of ethyl acetate and pentane; yield of the crude material: 6.0 g.

The starting material may be prepared as follows: to a solution of 2,4-di-phenyl-butyronitrile in 75 ml. of N,N-dimethylformamide, cooled in an ice bath, is added while stirring 5.5 g. of a 53 percent mineral oil suspension of sodium hydride. After the hydrogen evolution has ceased, a solution of 17 g. of methyl iodide in 50 ml. of N,N-dimethylformamide is added; the ice bath is removed and stirring is continued at room temperature for one hour. Benzene is added, the resulting precipitate is filtered off and the greater part of solvent is removed under reduced pressure. The oily residue is diluted with water, the organic product is extracted with three portions of diethyl ether, and the organic extracts are washed with water and a saturated sodium chloride solution. After drying over sodium sulfate, the solvent is evaporated and the oily product is distilled in the temperature range of 100–135°/0.01 mm. The desired 2,4-di-phenyl-2-methyl-butyronitrile is recovered as a pale yellowish liquid; yield: 20.0 g.

A mixture of 20.0 g. of 2,4-di-phenyl-2-methyl-butyronitrile, 80 ml. of 95 percent ethanol and 80 g. of a 50 percent aqueous sodium hydroxide solution is refluxed for 70 hours. The ethanol is distilled off and replaced by 200 ml. of water; the free 2,4-di-phenyl-2-methyl-butyric acid precipitates by acidifying the aqueous solution with 6 N hydrochloric acid, and is recrystallized from a mixture of benzene and pentane, M.P. 107–108°; yield of the crude acid: 22 g.

To 180 g. of polyphosphoric acid, preheated to 105° is added 36.5 g. of 2,4-di-phenyl-2-methyl-butyric acid while stirring; the reaction mixture is maintained at that temperature for thirty minutes and is then poured into ice water. The aqueous mixture is neutralized with 50 percent aqueous sodium hydroxide and the organic material is extracted with three portions of diethyl ether. The organic extracts are washed with a saturated solution of sodium chloride, dried over sodium sulfate and evaporated to dryness. The resulting oil is distilled at 100–115°/0.05 mm. to yield the desired 2-methyl-2-phenyl-1,2,3,4-tetrahydro-naphthalen-1-one which crystallizes from a pentane solution, M.P. 66–67°; yield: 29.5 g.

To a suspension of 14.5 g. of 2-methyl-2-phenyl-1,2,3,4-tetrahydro-naphthalen-1-one in 15 ml. of acetic acid anhydride is added dropwise a mixture of 3 ml. of fuming nitric acid and 3 ml. of acetic acid anhydride while stirring and keeping the temperature below 10°. The reaction mixture is allowed to stand overnight at 5° and is then poured into ice water. After the resulting mixture has reached room temperature, the aqueous layer is decanted, the oily product is taken up into ethyl acetate and the organic solution is washed with a 2 N aqueous sodium carbonate solution, water and a saturated aqueous sodium chloride solution. After drying over sodium sulfate, the solution is evaporated to dryness to yield 14.0 g. of a viscous brown oil, which crystallizes from a mixture of ethyl acetate and pentane. The desired 2-methyl-2-(4-nitro-phenyl)-1,2,3,4-tetrahydro-naphthalen-1-one of the formula:

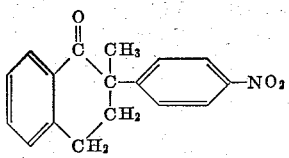

melts at 134–136°.

Other compounds which may be prepared according to the above-described procedures are, for example, 2-(4-amino-phenyl)-6-chloro-1,2,3,4-tetrahydro - naphthalen-1-one, 2-(4-amino-phenyl)-6-methyl-1,2,3,4-tetrahydro-naphthalen-1-one, or 7-amino-2-(4-amino-phenyl)-1,2,3,4-tetrahydro-naphthalen-1-one, as well as 2-(4-amino-phenyl)-indan-1-one or 2-(4-amino-phenyl)-benzsuberan-1-one and the like.

N-acylated compounds, such as, for example, 2-(4-N-propionylamino-phenyl)-1,2,3,4-tetrahydro-naphthalen-1-one, 2-(4-N-nicotinoylamino-phenyl)-1,2,3,4-tetrahydro-naphthalen-1-one and the like, may be prepared from the corresponding compounds containing a free amino group according to known methods, for example, by treatment with an acid halide, e.g., acetyl chloride, nicotinoyl chloride and the like, in the presence of a base, e.g., pyridine and the like.

What is claimed is:

1. Compounds of the formula

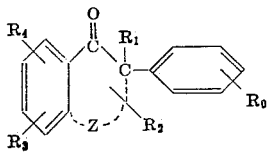

in which $R_0$ stands for a member selected from the group consisting of chloro, bromo, iodo and nitro, Z represents a 1,2-ethylene radical, each of the groups $R_1$ and $R_2$ stands for a member selected from the group consisting of hydrogen and lower alkyl, and each of the groups $R_3$ and $R_4$ stands for a member selected from the group consisting of hydrogen, lower alkyl, halo-lower alkyl, hydroxyl, lower alkoxy, halo, mercapto, lower alkyl-mercapto, nitro amino, N-lower alkyl-amino and N,N-di-lower alkyl-amino.

2. Compounds of the formula

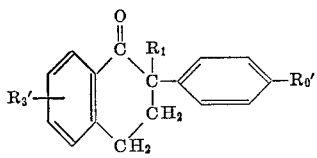

in which $R_0'$ represents a member selected from the group consisting of bromo and nitro, $R_1$ represents a member selected from the group consisting of hydrogen and lower alkyl, and $R_3'$ represents a member selected from the group consisting of hydrogen, lower alkyl, lower alkoxy, halo, nitro and amino.

3. 2-(4-bromo-phenyl)-1,2,3,4-tetrahydro-naphthalen-1-one.

4. 2-methyl-2-(4-nitro-phenyl)-1,2,3,4-tetrahydro-naphthalen-1-one.

References Cited by the Examiner

UNITED STATES PATENTS 2,836,624   5/1958   Gentry et al. _____ 260—590

OTHER REFERENCES

Christol et al., Bull. Soc. Chim. France, 1960, 1696–1699.

LEON ZITVER, *Primary Examiner.*

DANIEL D. HORWITZ, *Examiner.*